United States Patent
King et al.

(10) Patent No.: US 7,250,904 B2
(45) Date of Patent: Jul. 31, 2007

(54) NAVIGATION SATELLITE ACQUISITION IN SATELLITE POSITIONING SYSTEM RECEIVER

(75) Inventors: Thomas Michael King, Tempe, AZ (US); Alan Chang, Phoenix, AZ (US); Troy L. Strother, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 329 days.

(21) Appl. No.: 10/961,322

(22) Filed: Oct. 8, 2004

(65) Prior Publication Data

US 2006/0077096 A1 Apr. 13, 2006

(51) Int. Cl.
*G01S 1/00* (2006.01)
*H04B 7/185* (2006.01)

(52) U.S. Cl. .................................. 342/357.15
(58) Field of Classification Search ........... 342/357.01, 342/357.06–357.15, 352; 701/213–214
See application file for complete search history.

(56) References Cited

U.S. PATENT DOCUMENTS

| | | | | |
|---|---|---|---|---|
| 6,078,286 A * | 6/2000 | Gonzales et al. | ........... | 342/359 |
| 6,114,992 A * | 9/2000 | Underbrink | ........... | 342/357.15 |
| 6,212,133 B1 * | 4/2001 | McCoy et al. | ........... | 368/9 |
| 6,278,404 B1 * | 8/2001 | Niles | ........... | 342/359 |
| 6,384,778 B1 * | 5/2002 | Campbell | ........... | 342/359 |
| 6,392,593 B1 * | 5/2002 | Pemble | ........... | 342/357.15 |
| 6,535,801 B1 * | 3/2003 | Geier et al. | ........... | 701/13 |
| 6,549,850 B2 * | 4/2003 | Punkka et al. | ........... | 701/213 |
| 6,583,758 B2 * | 6/2003 | King | ........... | 342/357.13 |
| 6,583,759 B2 * | 6/2003 | Pietila et al. | ........... | 342/357.15 |
| 6,642,886 B2 * | 11/2003 | King | ........... | 342/357.15 |
| 6,650,288 B1 * | 11/2003 | Pitt et al. | ........... | 342/357.15 |
| 6,720,915 B2 * | 4/2004 | Sheynblat | ........... | 342/357.05 |
| 6,727,850 B2 * | 4/2004 | Park et al. | ........... | 342/357.15 |
| 6,825,805 B2 * | 11/2004 | Rowitch | ........... | 342/357.15 |
| 7,069,019 B2 * | 6/2006 | Sahai et al. | ........... | 455/456.1 |
| 2002/0113732 A1 * | 8/2002 | King | ........... | 342/357.11 |
| 2003/0231132 A1 * | 12/2003 | Park et al. | ........... | 342/357.15 |
| 2004/0183724 A1 * | 9/2004 | Sheynblat | ........... | 342/357.15 |
| 2006/0077096 A1 * | 4/2006 | King et al. | ........... | 342/357.15 |

\* cited by examiner

*Primary Examiner*—Thomas H. Tarcza
*Assistant Examiner*—Shelley Chen
(74) *Attorney, Agent, or Firm*—Roland K. Bowler II

(57) ABSTRACT

A method in a mobile satellite positioning system receiver operating in cold-start mode, including searching for and detecting (310) a first satellite in a constellation of orbiting satellites, searching (320) for a second satellite based on detection probability information for non-detected satellites, the detection probability information obtained using information about one of satellites not detected or the first satellite detected. In one embodiment, the detection probability information is based on a measure of range between the non-detected satellites and the first satellite detected, and in another embodiment the detection probability information is based on a measure of angle between the non-detected satellites and the first satellite detected.

21 Claims, 7 Drawing Sheets

NAVIGATION SATELLITE ACQUISITION IN SATELLITE POSITIONING SYSTEM RECEIVER

FIELD OF THE DISCLOSURE

The present disclosure relates generally to satellite positioning system (SPS) receivers, and more particularly to navigation satellite acquisition in SPS receivers, for example, in mobile SPS receivers operating in cold-start mode, corresponding methods and apparatuses.

BACKGROUND OF THE DISCLOSURE

A satellite navigation receiver must detect and acquire the precise orbit (ephemeris) data for at least four satellites before it can produce a 3-dimensional position solution. In cold-start sky-search mode, however, the satellite navigation receiver has no prior knowledge of what satellites are visible and not visible. Moreover, in this mode, the satellite navigation receiver generally will not have accurate time and position information, valid satellite ephemeris data, approximate satellite Doppler or code phase information. Searching for a satellite in cold-start mode thus requires searching all possible code phases (0-2045 half-chips) and all possible Doppler frequencies (+/−4,100 Hz +/− reference oscillator uncertainty). A typical satellite navigation receiver searches linearly for one or more satellites at a time, wherein the satellite search order is based on the satellite identification (SVID), for example, search for SV1, then SV2, SV3 and so on through the last satellite in the constellation. The period of time between starting the search for the first satellite and computation of an accurate position computation is called the time-to-first-fix (TTFF).

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
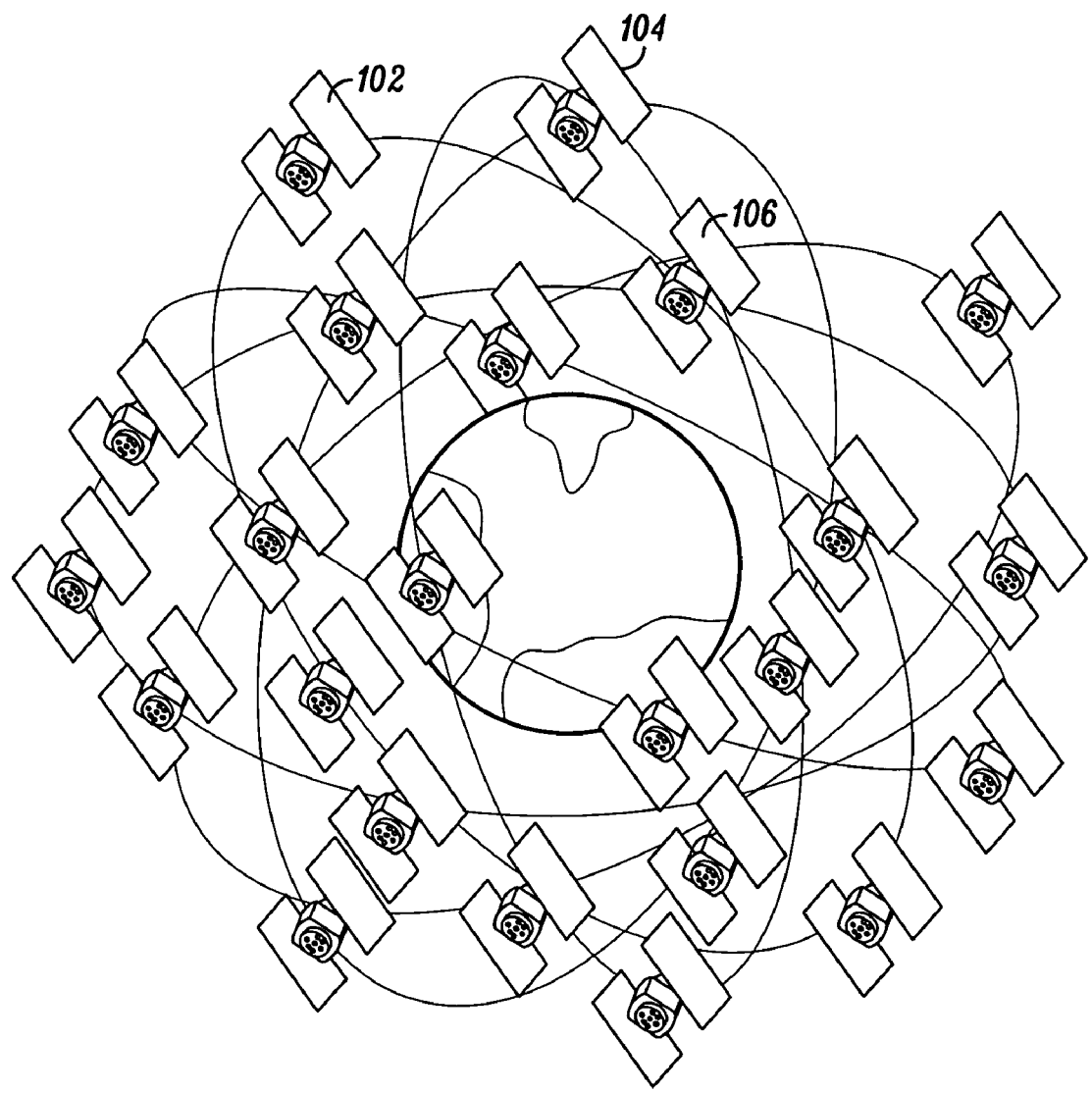
FIG. 1 illustrates an exemplary satellite constellation.

FIG. 1 illustrates an exemplary satellite navigation system 100 comprising a constellation of earth-orbiting satellites 102, 104, 106 . . . Exemplary earth-orbiting satellite constellations include the NAVSTAR GPS system, GLONASS, and the proposed Galileo system. More generally, the satellite constellation may orbit a celestial body other than earth, for example, another plant or moon. Each of the exemplary constellations comprise 20 to 30 satellites having generally periodic orbits relative to the earth's rotation to provide nearly the same repeatable geometry or visibility pattern from the user's perspective on earth. For example, all the satellites of the GPS constellation are in approximately 12-hour orbits, causing a particular satellite to fly over nearly the same earth locations on subsequent days. Since the earth rotates once every 23 hours 56 minutes, there is a four-minute per day precession of the constellation geometry, which repeats once per year. GPS satellites also positioned in six orbital planes with four or more satellites per plane. Each GPS satellite also crosses the equator with an inclination angle of 55 degrees in order to maximize the coverage for users anywhere on the earth's surface. Other satellite constellations have similar constellation characteristics.

Figure 2:
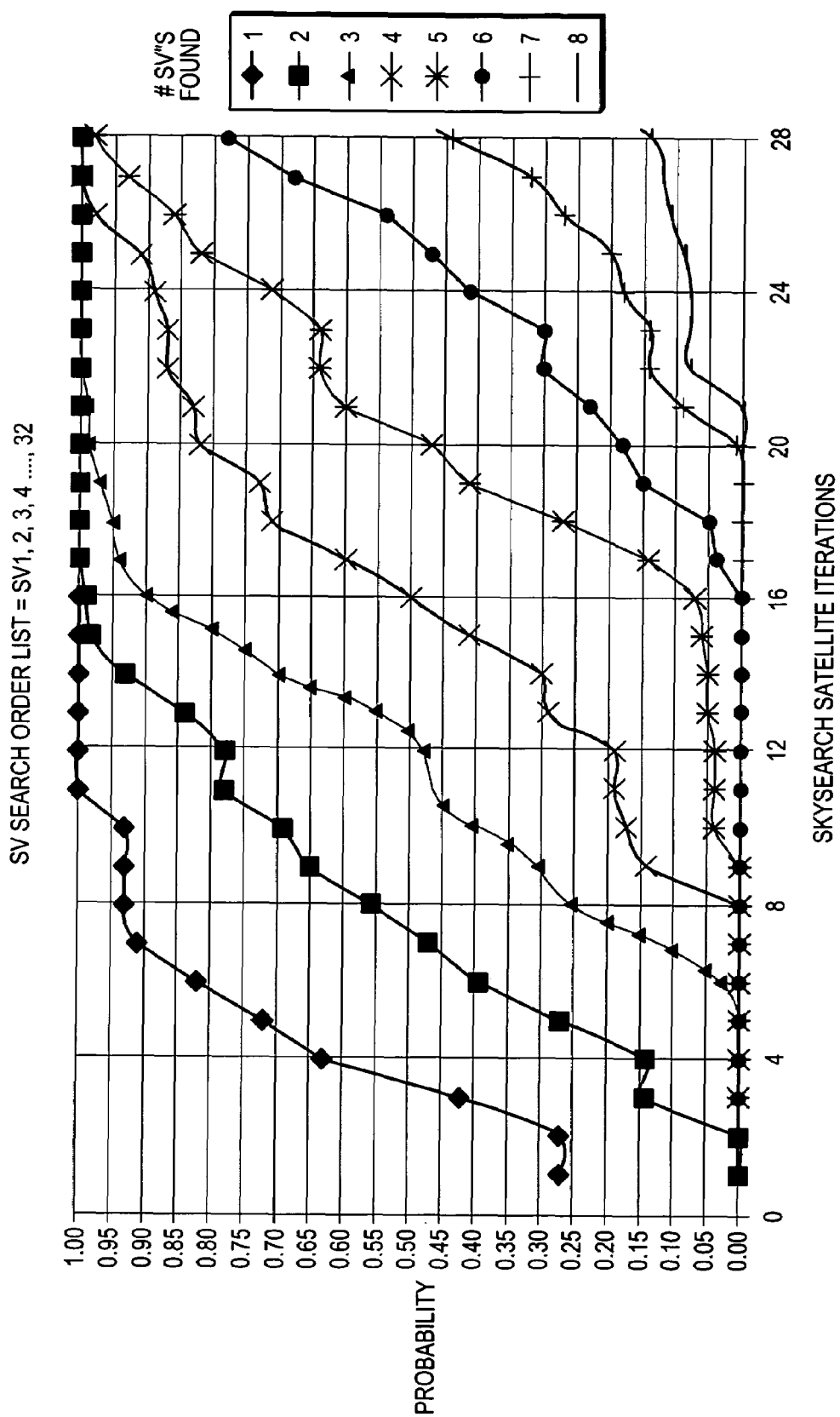
FIG. 2 represents acquisition time statistics for a non-adaptive sky search.

A signal from a particular GPS satellite shines on approximately 40% of the earth's surface, though the coverage area changes due to the relative motion between the satellite and earth. Given a random, for example, linear {SV1, SV2, SV3 . . . }, search order in which the receiver, the probability of finding each satellite is approximately 40% per dwell period. FIG. 2 depicts the probability of finding the $1^{st}$, $2^{nd}$, $3^{rd}$, $4^{th}$ and so forth satellites as a function of the number of search iterations. The curve labeled "1" represents the probability of finding the first satellite as a function of the number of iterations to search. The curve labeled "2" represents the probability of finding the second satellite as a function of the number of iterations to search, and so forth. The typical (50% probability) time to find 4 satellites is 16 satellite search iterations.

According to one aspect of the instant disclosure, the satellite search order is dynamically adapted based on one or more previously detected satellites. In some applications, the adaptive search order can find 4 or more satellites on average in as few as 6 search iterations compared to 16 or more iterations common with random satellite searches. Another aspect of the disclosure relates to selecting an optimized initial satellite search order to reduce the time required to detect the first satellite.

Figure 3:
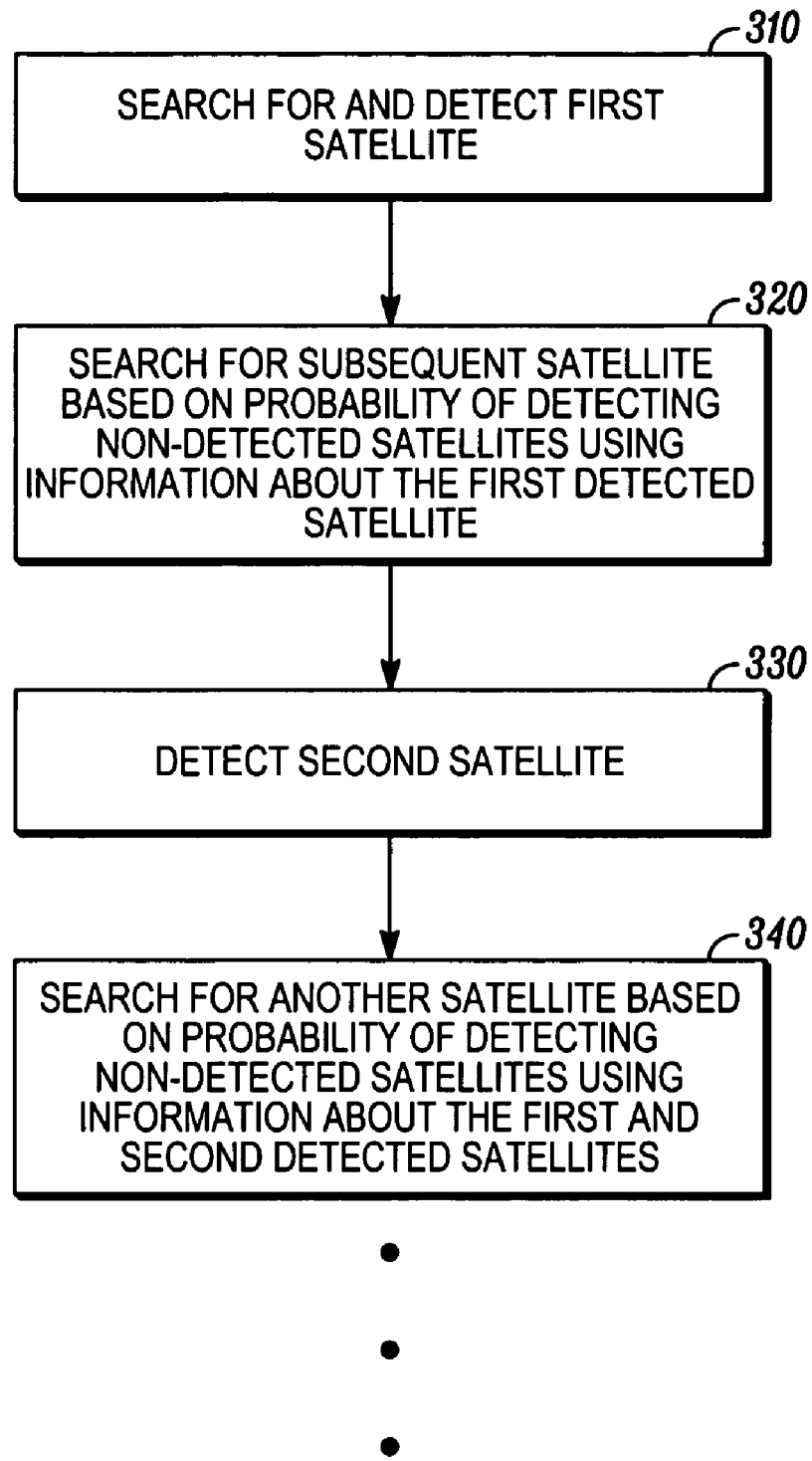
FIG. 3 is an exemplary adaptive satellite search process flow diagram.

In one embodiment, to improve upon prior art non-adaptive satellite search methods, the satellite search order is dynamically re-computed, or adapted, after detecting each new satellite to increase the probability of detecting the next satellite. In the process flow diagram 300 of FIG. 3, at block 310, the satellite navigation receiver searches for and detects a first satellite. In one embodiment, the initial search order is optimized using any information available to the satellite navigation receiver as discussed more fully below. At block 320, the satellite navigation receiver searches for a subsequent non-detected satellite based upon the probability of detecting the non-detected satellites using information about the first detected satellite. Satellites searched but not detected before detecting the first satellite may be given low priority in subsequent searches or not included in the new search order. In FIG. 3 at block 330, a second satellite is detected. At block 340, the satellite navigation receiver searches for another non-detected satellite based upon the probability of detecting the non-detected satellites using information about the detected satellite. Satellites searched before detecting the first and second satellites may be given low priority in subsequent searches or not searched further, as discussed more fully below. The process repeats until a sufficient number of satellites have been detected to compute location. Thus instead of randomly searching for satellites, for example, searching for satellites SV1, SV2 . . . SVN, the search order is adjusted to increase the likelihood of detecting the next satellite searched using information about the first satellite detected.

Figure 4:
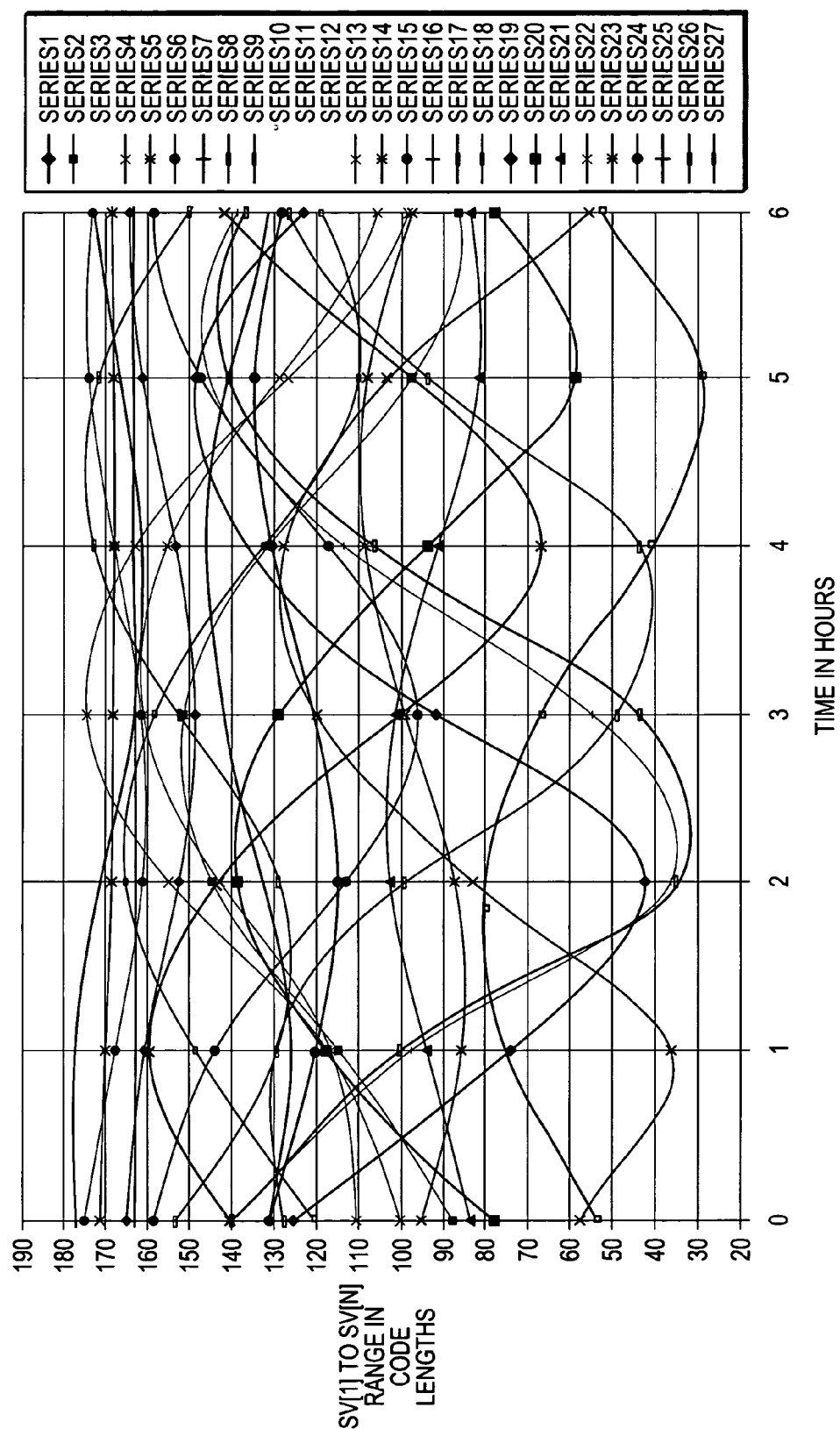
FIG. 4 is a range vs. time diagram illustrating the range pattern between one GPS satellite and all the other GPS satellites.

As suggested above, satellite orbits are deterministic and predictable. GPS satellites repeat over an 11 hour 56 minute period such that each satellite is positioned over the same location on the earth over the periodic cycle. As such, the satellite-to-satellite ranges are periodic with a 6-hour period. Other navigation satellite constellations have a similar period, not necessarily 6 hours. FIG. 4 illustrates the ranges from SV1 to all other satellites (SVs) in the GPS constellation, wherein the units of range are C/A code length, or 299,792.458 meters per code length. In FIG. 4, the satellite-to-satellite range waveforms are periodic over 6-hour intervals, and they are not dependent on absolute time. In FIG. 4, some satellite-to-satellite range waveforms have shallow sine-wave curves with a mean offset. These are produced from satellite pairs that are in adjacent orbital planes. Other satellite-to-satellite ranges cover a wider range of values. These are generally from satellites in orthogonal orbital planes. Satellites in the same orbital plane show constant range from one SV to the other. Satellites in the same orbital plane can be relatively close (next to each other in the same plane) or relatively far (in the same plane but on the opposite sides of the earth) from the subject satellite.

The satellite-to-satellite range over the periodic interval can be summarized as having an average value, a minimum value, a maximum value, a standard deviation or variance, that when considered together or individually, describe the satellite-to-satellite range and its change over a periodic period. For example, satellites that are always close to each other are also likely to be visible at the same time. Satellites that are a long distance from each other (large range) are unlikely to be jointly visible. Satellite-to-satellite ranges that vary over a large dynamic range have a probability of being jointly visible of approximately 50% or less.

As discussed above, once a sky-search process has found a first satellite, the order of searching for the remaining satellites can be optimized by computing the probability that each of the other satellites is also visible, then sorting the list of probabilities based on maximum-to-minimum probability, e.g., searching first for the satellites having the highest probability of being detected. The probability may be computed in different ways. In one embodiment, the probability is computed using range information based on ranges from non-detected satellites to the first detected satellite. Upon detected a second satellite, new range information is determined based on ranges from the remaining non-detected satellites to a combined (e.g., averaged) position of the first and second detected satellites. The process repeats until a sufficient number of satellites have been detected to compute location.

In one embodiment, determining range information includes determining an average range between each of the non-detected satellites and the first detected satellite. The average range is computed based on at least one period over which the range between satellites repeats, for example, the 6 hour repeat cycle depicted in FIG. 4 for GPS constellation satellites. For example, satellites may be searched in the order of their range, shortest range first and longest range last. In another embodiment, the range information is the min-to-max range deviation or range variance for the ranges between each of the non-detected satellites and the first detected satellite. The range deviation or variance may be computed over the satellite period. For example, satellites may be searched in the order of their range deviation or variance, shortest range deviation or variance first and longest range deviation or variance last. In another embodiment, the range information is the maximum and minimum range between each of the non-detected satellites and the first detected satellite, wherein the subsequent search is based on the maximum and minimum range.

In one exemplary implementation, the satellite search order is adapted based on first pre-storing satellite positions for a 6 consecutive hour period of time for any consecutive time period of the constellation. This can be accomplished using a satellite almanac data. In other embodiment, a different time schedule may be used, though a time-step of 1-hour is sufficient. For simplicity, satellite positions are stored in ECEF (earth-centered-earth-fixed) Cartesian coordinates in units of PN code lengths (299,792.458 meters per code length). An array can be described as a block of 576 bytes of memory signed one byte svp[6][32][3], wherein the first index [6] indicates the consecutive hour [0–5], the $2^{nd}$ index [32] indicates the satellite ID [0–31], and the $3^{rd}$ index [3] indicates the Cartesian coordinate axis [0=X, 1=Y, 2=Z].

A first or initial satellite search order is determined, for example, a sequential or random search order. Other predictive initial search orders are discussed further below. The initial satellite search order is placed in an ordered sky list, for example, the sequential list: Sky[32]={SV1, SV2, SV3, SV4 . . . , SV32}. Satellites are searched for in order from the Sky list. The satellite navigation receiver searches for SV1 first, then SV2 and so forth until the first satellite is detected. Once a first satellite (SVd) is detected, the range from SVd to all other satellites may be computed over the 6-hour period as follows:

```
for(time =0; time<6; time++)
{
    for(svid=0; svid<32; svid++)
    {
        if(svid != SVd)
        {
            range[time][svid] = | svp[time][svid][.] –
            svp[time][SVd][.] |
        }
    }
}
```

Next, the average range and min/max range over the 6-hour period for each range is computed as follows (in pseudocode):

```
average_range[svid] = average_of(range[time][svid] ) | time = 0 ... 6;
min_range[svid] = min_of (range[time][svid]) | time = 0 ... 6;
max_range[svid] = max_of (range[time][svid]) | time = 0 ... 6;
```

The average_range[svid] array is sorted from minimum to maximum. Optionally, the separation of min_range[svid] to max_range[svid] can be used as a secondary sort to improve the results, though this improvement is not necessary. Alternatively, the variance or standard deviation of the average_range parameter over the 6-hour period may be used to indicate how much the range changes over time. A secondary sort could be applied based on minimum average_range and minimum variance or standard deviation as well.

Beginning with the next satellite entry in the list Sky[32] to be searched, the Sky[32] list is replaced with the satellite identifications (SVIDs) corresponding to the minimum average_range through the maximum_average_range. For example, assume that SV3 in the exemplary list, Sky[32], was the first satellite detected. SV3 is the 3$^{rd}$ entry in the list. The entries for satellites SV4 through SV32 are replaced in the sky[32] list with the SVIDs corresponding to the least average range to the most average range for those satellites not already searched. This process creates a new Sky[32] list for the remaining searches. Searching proceeds from the list where left off, in the example, index=3 is the next satellite searched.

Upon detecting two or more satellites, the re-ordering of the search list changes based on computing a reference "pseudo-satellite" position. The pseudo-satellite position is based on the average position of the two or more detected satellites over the 6-hour period. The range to all other non-detected satellites is then computed relative to the pseudo_satellite as follows:

```
for(time =0; time<6; time++)
{
    for(svid=0; svid<32; svid++)
    {
        if(svid != any svid already searched for )
        {
            range[time][svid] = | svp[time][svid][.] −
            Pseudo_satellite_position[time][.] |
        }
    }
}
```

The average range and min/max for each range over the 6-hour period for each range is computed relative to the pseudo_satellite position as follows (in pseudocode):

```
average_range[svid] = average_of(range[time][svid] ) | time = 0 ... 6;
min_range[svid] = min_of (range[time][svid]) | time = 0 ... 6;
max_range[svid] = max_of (range[time][svid]) | time = 0 ... 6;
```

The average_range[svid] is again sorted from minimum to maximum average_range. The next to be tested entry in the list Sky[32] is replaced with the SVID corresponding to the minimum average_range. The process repeats until sufficient satellites are found for a fix or all satellites are searched. As each new satellite is detected, the search order is refined based on increasing the likelihood of detecting the next satellite to be searched. The new search order is based on lowest proximity (approximately inversely proportional to the probability of joint-detection) of the non-detected satellites to the average position of the detected satellites over the 6-hour window.

Figure 5:
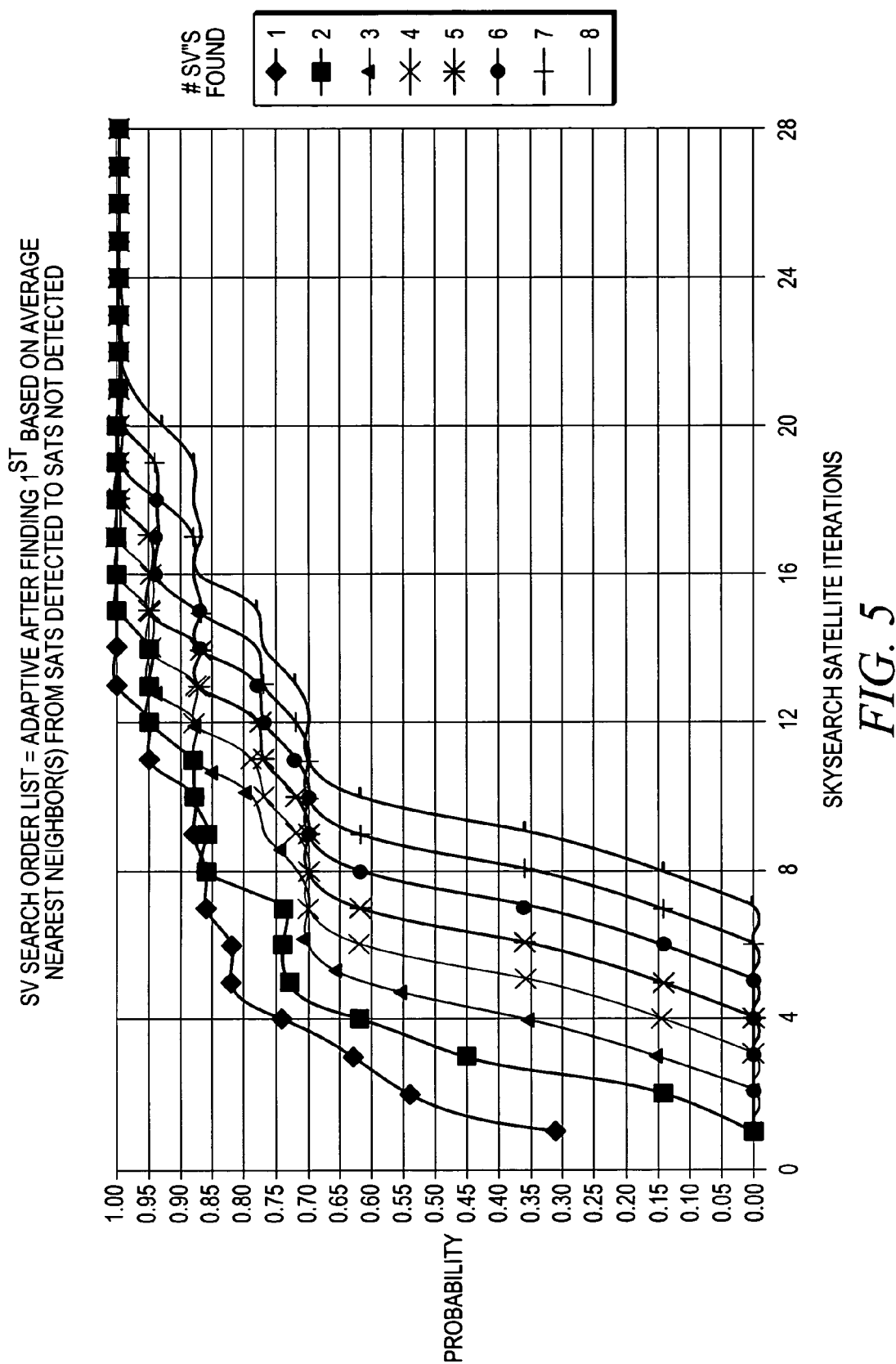
FIG. 5 illustrates acquisition time statistics for an adaptive sky search.

FIG. 5 illustrates the improvement in performance of an adaptive search in which each new satellite detected is used to refine the search order for the next satellite(s) to be searched, as described above. The typical (50% probability) time to find 4 satellites is 6 satellite search iterations compared to 16 iterations for a random search as discussed above in connection with FIG. 2. This corresponds to a search time decrease of approximately 37% of the original search time. After finding at least 2 satellites, it typically takes only an additional search iteration to find the next satellite. That is, one additional satellite is found after each additional search iteration based on the algorithm improving the probability of finding the next satellite based on selecting the next satellite to search based on the minimum average distance to those satellites already detected. While the exemplary method described adaptively re-orders the sky-search list based on each new satellite detection, the search may alternatively be reordered based on each new satellite not detected.

Another way to compute the probability of detected a satellite is to compute angles between a first detected satellite and all other non-detected satellites.

$$\text{Theta} = \arccos(x*y)/(|x|*|y|) \quad \text{Eq. (1)}$$

where x and y are the 3-dimensional vector representing satellite X location and satellite Y location (in earth-centered earth fixed coordinates). The operation x*y is the vector dot-product, while |x| and |y| represent the magnitude of the location vectors. The angle theta represents the angle subtended by the vectors A and B; where A is the vector from the center of the earth to the detected satellite x and B is the vector from the center of the earth to any of the other non-detected for satellite y. Presumably the smaller the angle, the more likely that Y is detectable if X has already been detected. According to this method, upon detecting a second satellite, the positions between the first and second satellites are combined, and then the angles are computed between the non-detected satellites and the combined position of the two or more detected satellites.

As suggested above, in some embodiments, it may be possible to optimize the initial search order for searching for the first satellite in cold-start mode. The initial satellite search order list may be prioritized based on very generally information. In some applications, reasonable assumptions may be made depending on where the satellite navigation receiver is operating, for example, whether it is more likely located in the Northern or Southern hemisphere as is the case for many GPS enabled cellular telephones, or in a body of water as is the case for marine units. Thus the initial satellite search may be ordered based on the satellites most likely visible in a specified range of latitudes. The search order may also be ordered based on which satellites are most visible or the duration of visibility.

The left-most curve in FIG. 2 shows the statistics of the number of iterations required to detect a first satellite. 50% of the time it takes about 3.5 search iterations to find the 1$^{st}$ satellite. It does not achieve 95% detection probability of the first satellite until 11 satellite search iterations are complete. In one embodiment, the optimum search order list for the first N satellites to be searched is determined statistically using a Monte-Carlo process. Given a valid almanac to compute the locations of the satellites over a 24 hour period, iterate as follows:

1) Randomly select a Sky[32] search ordered list;
2) Search for satellites using a simulated detection scheme over a 24-hour period, over a most-likely user region of operation, for example, the mid-northern latitudes;
3) Measure performance statistics by iterating (changing time and user location) a large number of times per Sky[32] list selected in step 1. Record the # search iterations to get to 50%, 67%, 95% probability of finding the first satellite;
4) Keep a copy of Sky[32] list that produced the best performance (minimum number of search iterations for a particular test statistic, for example, the 95% probability statistic);
5) Iterate 1-4 for a fixed number of iterations, for example, 1 million or more; and
6) Select the Sky[32] list that produced the best performance (least number of iterations to achieve a particular % probability).

Figure 6:
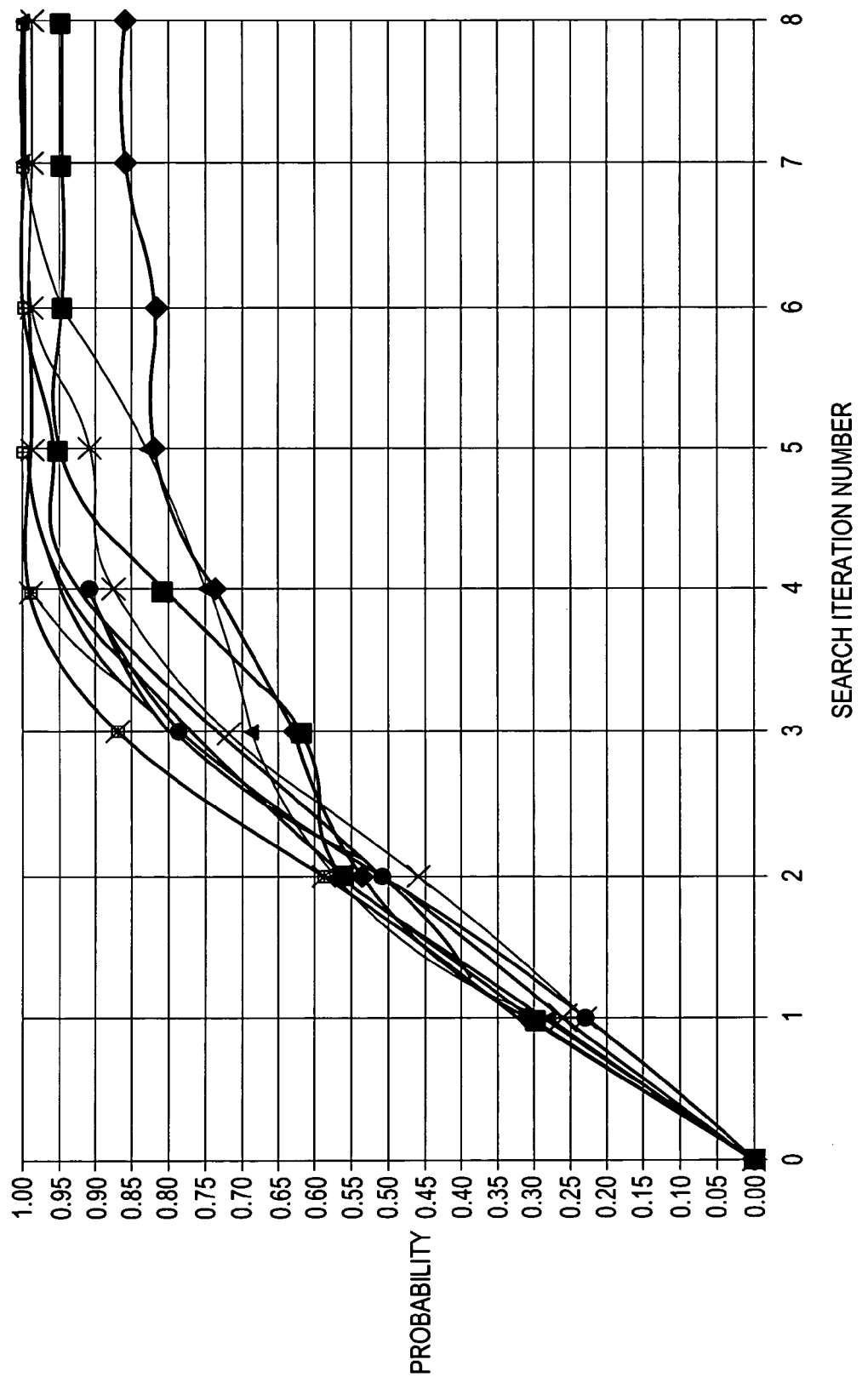
FIG. 6 illustrates the performance of exemplary SVID search orders.

For a constellation having 32 satellites, there are $10^{35}$ possible search order combinations, which is an impractical number of iterations to perform sequentially. A search order that performs acceptably may be identified, without trying all combinations using a limited Monte-Carlo search strategy. FIG. 6 illustrates the performance of exemplary SVID search orders. In FIG. 6, the best performing curve achieves 95% statistical first satellite detection in only 3.5 iterations.

The optimum initial satellite ID sky search order is then created iteratively via Monte-Carlo Iteration as follows:
ITERATION 1: Use a Monte-Carlo iteration to randomly select the search order for the satellites, for example 29 GPS constellation satellites. Measure the performance of each search order via a curve as shown in FIG. 5. Iterate many random order trials, remembering the best along the way. The first search results establish the order of the first N satellites, the remaining 29-N satellites have little or no effect on the performance. For example, in FIG. 5, there is little gains after 4 iterations, thus the best first-4 satellite ID's are selected.

ITERATION 2: Next, remove the best 4 satellites determined in ITERATION 1 from the constellation, resulting in 25 satellites. Use a Monte-Carlo iteration to randomly select search order for the remaining satellites. Again, the first 4 will dominate so append the first 4 from iteration 2 from the first 4 from iteration 1. This creates the first 8-satellite search order list.

ITERATION 3: Remove the best 8 satellites determined in ITERATION 1 and 2, creating a constellation of 21. Continue the process.

ITERATION 4-N: Repeat until all satellites are ordered.

Once the optimum initial search order is determined, based on a geographical region in which the receiver will most likely be used, the initial search order can be programmed into the unit's ROM memory at manufacturing, the receiver need not compute the initial search order once the initial search order is pre-determined and stored.

Figure 7:
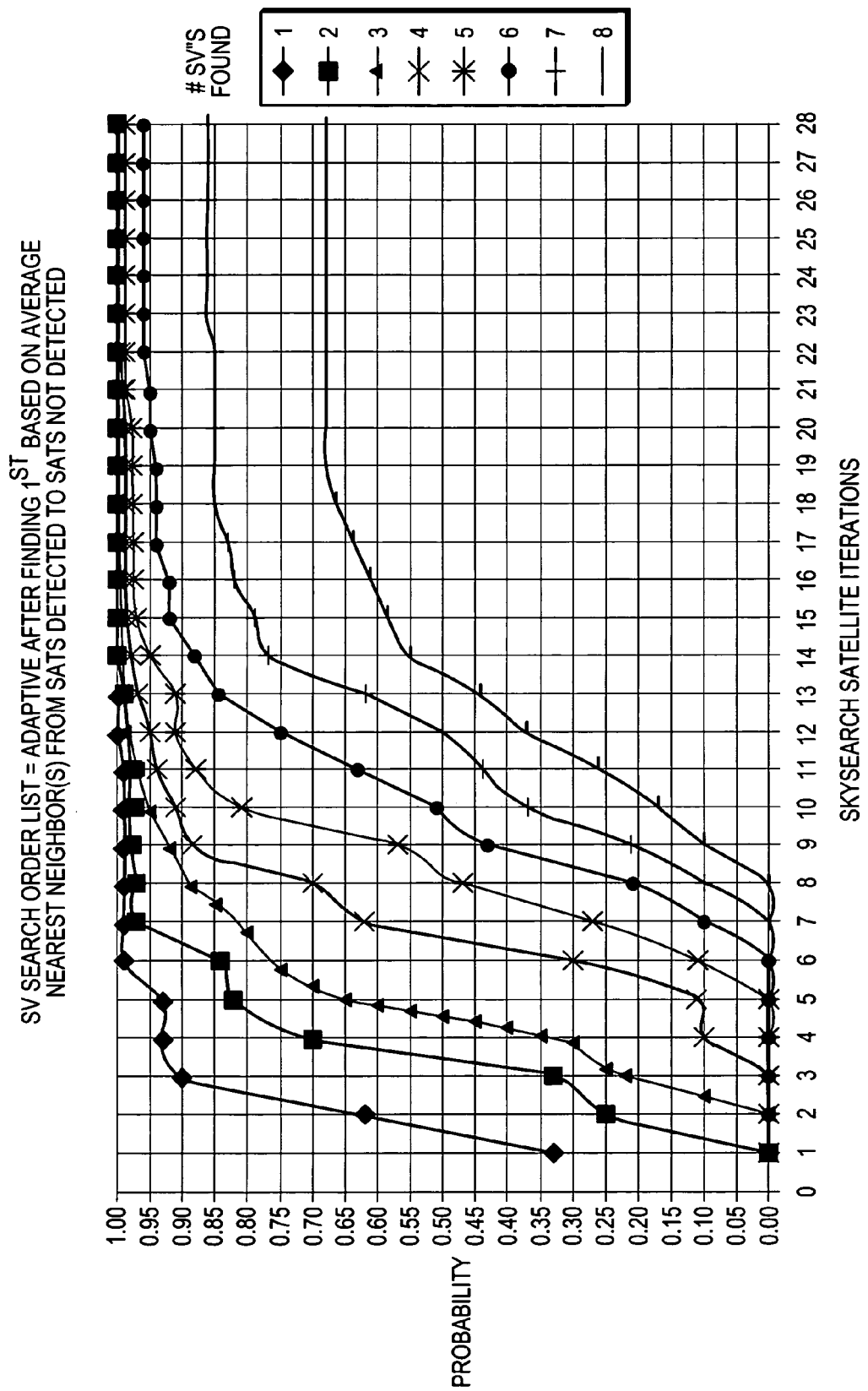
FIG. 7 is a composite acquisition time statistic chart which combines the effects of the dynamic search order method and the best sky search order to find the $1^{st}$ satellite.

By combining the optimum search order for finding the first satellite most quickly with the adaptive sky search method of dynamically changing the search order based on proximity to the average position of the detected satellites, the performance of the combined effects of the two methods are shown in FIG. 7. Significant performance gain is achieved over the standard linear satellite ID search shown in FIG. 2.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a satellite positioning system receiver, the method comprising:
   detecting a first satellite in a constellation of satellites;
   determining range information including range variance between non-detected satellites and the first detected satellite,
   searching for a subsequent satellite using the range information.

2. The method of claim 1,
   detecting a second satellite in the constellation of satellites using range information,
   determining new range information based on ranges from non-detected satellites to a combined position of the first and second satellites detected.

3. The method of claim 2,
   detecting a third satellite in the constellation of satellites using the new range information,
   determining subsequent range information based on ranges from remaining non-detected satellites to a combined position of the first, second and third satellites detected.

4. The method claim 1,
   determining range information includes determining an average range between each of the non-detected satellites and the first detected satellite,
   searching for the subsequent satellite based on the average ranges.

5. The method of claim 4, determining the average range between each of the non-detected satellites and the first detected satellite based on at least one period over which range between satellites repeats.

6. The method of claim 1,
   detecting the first satellite by searching for satellites in the satellite positioning system,
   searching for the subsequent satellite based on the range information for only satellites not searched before detecting the first satellite.

7. The method of claim 1,
   detecting the first satellite by searching for satellites in a satellite constellation,
   excluding satellites searched before detecting the first satellite when searching for the subsequent satellite based on the range information.

8. The method of claim 1,
   detecting the first satellite by searching a constellation of satellites,
   prioritizing the search for the first satellite based on which satellites of the constellation are most visible within a specified range of latitudes.

9. The method of claim 1,
   detecting the first satellite by searching a constellation of satellites,
   prioritizing the search for the first satellite based on a duration of visibility of the satellites located within the specified range of latitudes.

10. A method in a satellite positioning system receiver, the method comprising:
    prioritizing a satellite search order for a satellite in a constellation of orbiting satellites based on a randomized Monte-Carlo simulation that randomly selects and tests search orders over a geographic region and over the constellation orbit period;
    searching for the satellite in the constellation based upon the prioritized search order.

11. The method of claim 10, prioritizing the search order for the satellite in the constellation based on a duration of visibility of satellites within a specified range of latitudes.

12. The method of claim 10,
    detecting a first satellite,
    determining probability detection information for non-detected satellites in the constellation,
    re-prioritizing the satellite search order based on the probability detection information,
    searching for another satellite in the constellation based upon the re-prioritized search order.

13. The method of claim 10, searching for the satellite in the constellation based upon the prioritized search order includes searching for a first satellite in a cold-start mode of operation of the satellite positioning system receiver.

14. A method in a mobile satellite positioning system receiver, the method comprising:

searching for a satellite in a constellation of orbiting satellites;

detecting a first satellite, determining an initial satellite search order for the first satellite based on whether the mobile satellite positioning system receiver is on land or water;

searching for a second satellite based on detection probability information for non-detected satellites, the detection probability information obtained using information about one of satellites not detected or the first satellite detected.

15. The method of claim 14, obtaining the detection probability information for the non-detected satellites based on a measure of range between the non-detected satellites and the first satellite detected.

16. The method of claim 15, detecting a second satellite in the constellation of orbiting satellites, searching for a third satellite based on new detection probability information for non-detected satellites, obtaining the new detection probability information for the non-detected satellites based on based on a measure of range between the non-detected satellites and a combination of the first and second satellites detected.

17. The method of claim 14, determining the detection probability information based on a measure of angle between the non-detected satellites and the first satellite detected.

18. The method of claim 14, determining an initial satellite search order for the first satellite based on which satellites are more most visible within a specified range of latitudes.

19. The method of claim 14, determining an initial satellite search order for the first satellite based on a duration of visibility of the satellites.

20. The method of claim 14, detecting the first satellite in cold-start mode, searching for a second satellite based on detection probability information for non-detected satellites in cold-start mode.

21. A method in a satellite positioning system receiver, the method comprising:

detecting a first satellite in a constellation of satellites;

searching for a subsequent satellite using range information based on ranges from non-detected satellites to the detected satellite, determining range information includes determining maximum and minimum range between each of the non-detected satellites and the first detected satellite, searching for a subsequent satellite based on the maximum and minimum range.

* * * * *